United States Patent
Rajagopal

(10) Patent No.: US 9,280,596 B2
(45) Date of Patent: Mar. 8, 2016

(54) METHOD AND SYSTEM FOR SCORING ARTICLES IN AN ON-DEMAND SERVICES ENVIRONMENT

(75) Inventor: Vinodh Rajagopal, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 130 days.

(21) Appl. No.: 13/082,299

(22) Filed: Apr. 7, 2011

(65) Prior Publication Data

US 2012/0005218 A1    Jan. 5, 2012

Related U.S. Application Data

(60) Provisional application No. 61/360,752, filed on Jul. 1, 2010.

(51) Int. Cl.
*G06F 17/30* (2006.01)

(52) U.S. Cl.
CPC .... *G06F 17/30654* (2013.01); *G06F 17/30634* (2013.01)

(58) Field of Classification Search
CPC .................................................. G06F 17/30634
USPC ......... 707/736, 737, 748, 752, 755–758, 781, 707/999.003; 715/736, 738, 854; 709/203
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Syling Yen
(74) *Attorney, Agent, or Firm* — Weaver Austin Villeneuve & Sampson LLP

(57) ABSTRACT

A method for scoring and ranking knowledge articles in an on-demand service environment in a database network system. The scoring allows users to have input into the scoring to determine relevancy and authenticity to solve particular problems.

19 Claims, 9 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,560,554 B2 | 10/2013 | Gradin et al. |
| 8,560,575 B2 | 10/2013 | Gradin et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186828 A1* | 9/2004 | Yadav et al. ............ 707/3 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0028104 A1* | 2/2005 | Apparao et al. ............ 715/738 |
| 2005/0050555 A1 | 3/2005 | Exley et al. |
| 2005/0091098 A1 | 4/2005 | Brodersen et al. |
| 2005/0210079 A1* | 9/2005 | Edlund et al. ............ 707/204 |
| 2005/0283473 A1* | 12/2005 | Rousso et al. ............ 707/5 |

(56) References Cited

U.S. PATENT DOCUMENTS

| | | |
|---|---|---|
| 2006/0085395 A1* | 4/2006 | Cradick et al. .................. 707/3 |
| 2006/0112111 A1* | 5/2006 | Tseng et al. .................. 707/100 |
| 2007/0038646 A1* | 2/2007 | Thota .................. 707/100 |
| 2007/0050361 A1* | 3/2007 | Al-Masri .................. 707/7 |
| 2008/0249972 A1 | 10/2008 | Dillon |
| 2008/0275884 A1 | 11/2008 | Yoshida et al. |
| 2009/0024457 A1* | 1/2009 | Foroutan .................. 705/12 |
| 2009/0063415 A1 | 3/2009 | Chatfield et al. |
| 2009/0100342 A1 | 4/2009 | Jakobson |
| 2009/0164915 A1 | 6/2009 | Gasn et al. |
| 2009/0177744 A1 | 7/2009 | Marlow et al. |
| 2009/0287678 A1* | 11/2009 | Brown et al. .................. 707/5 |
| 2011/0137940 A1 | 6/2011 | Gradin et al. |
| 2011/0218958 A1 | 9/2011 | Warshavsky et al. |
| 2011/0225417 A1* | 9/2011 | Maharajh et al. .................. 713/150 |
| 2011/0247051 A1 | 10/2011 | Bulumulla et al. |
| 2011/0302098 A1 | 12/2011 | Yoshida et al. |
| 2011/0307498 A1 | 12/2011 | McFarlane et al. |
| 2011/0307510 A1 | 12/2011 | Lopitaux et al. |
| 2011/0321148 A1 | 12/2011 | Gluck |
| 2011/0321150 A1 | 12/2011 | Gluck |
| 2012/0005218 A1 | 1/2012 | Rajagopal |
| 2012/0042218 A1 | 2/2012 | Cinarkaya et al. |
| 2012/0047445 A1 | 2/2012 | Rajagopal |
| 2012/0066160 A1 | 3/2012 | Jagota |
| 2012/0078917 A1 | 3/2012 | Gradin et al. |
| 2012/0079004 A1 | 3/2012 | Herman |
| 2012/0116982 A1 | 5/2012 | Yoshida et al. |
| 2012/0151062 A1 | 6/2012 | Gusev et al. |
| 2012/0233137 A1 | 9/2012 | Jakobson et al. |
| 2012/0290407 A1 | 11/2012 | Hubbard et al. |
| 2012/0311054 A1 | 12/2012 | Yoshida et al. |
| 2013/0024454 A1 | 1/2013 | Dunn |
| 2013/0054582 A1 | 2/2013 | Macklem et al. |
| 2013/0091217 A1 | 4/2013 | Schneider |
| 2013/0097500 A1 | 4/2013 | Rajagopal |
| 2013/0117683 A1 | 5/2013 | Rajagopal |
| 2013/0185654 A1 | 7/2013 | Harris et al. |
| 2013/0212497 A1 | 8/2013 | Zelenko et al. |
| 2013/0218869 A1 | 8/2013 | McConnell et al. |
| 2013/0218877 A1 | 8/2013 | Satyanarayanan |
| 2013/0218882 A1 | 8/2013 | McConnell et al. |
| 2013/0218883 A1 | 8/2013 | McConnell et al. |
| 2013/0218885 A1 | 8/2013 | Satyanarayanan |
| 2013/0218948 A1 | 8/2013 | Jakobson |
| 2013/0218949 A1 | 8/2013 | Jakobson |
| 2013/0218966 A1 | 8/2013 | Jakobson |
| 2013/0218991 A1 | 8/2013 | McConnell et al. |
| 2013/0246406 A1 | 9/2013 | McFarlane et al. |
| 2013/0247216 A1 | 9/2013 | Cinarkaya et al. |
| 2013/0290059 A1 | 10/2013 | Troiani |
| 2013/0297699 A1 | 11/2013 | Yoshida et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |

* cited by examiner

US 9,280,596 B2

METHOD AND SYSTEM FOR SCORING ARTICLES IN AN ON-DEMAND SERVICES ENVIRONMENT

CLAIM OF PRIORITY

This application claims the benefit of U.S. Provisional Patent Application 61/360,752 entitled METHOD AND SYSTEM FOR SCORING AND RANKING ARTICLES IN AN ON-DEMAND SERVICES ENVIRONMENT, by Vinodh Rajagopal, Jul. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

United States Utility patent application Ser. No. 13/082, 299 entitled METHOD AND SYSTEM FOR SCORING AND RANKING ARTICLES IN AN ON-DEMAND SERVICES ENVIRONMENT, by Vinodh Rajagopal, filed Apr. 7, 2011; and U.S. Provisional Patent Application No. 61/354,003 entitled METHODS AND SYSTEMS FOR ANALYZING SEARCH TERMS IN A MULTI-TENANT DATABASE SYSTEM ENVIRONMENT, by Olivier Y. Pin et al., filed Jun. 11, 2010; and U.S. patent application Ser. No. 11/716,365 entitled METHOD AND SYSTEM FOR POSTING IDEAS, by Norimasa Yoshida et al., filed Mar. 8, 2007, which is now U.S. Pat. No. 7,831,455; and U.S. patent application Ser. No. 11/786,882 entitled METHOD AND SYSTEM FOR MANAGING IDEAS, by Norimasa Yoshida et al., filed Apr. 13, 2007, which is now U.S. Pat. No. 7,818,194; and U.S. patent application Ser. No. 11/801,572 entitled METHOD AND SYSTEM FOR INTEGRATING IDEA AND ON DEMAND SERVICES, by Norimasa Yoshida et al., filed May 9, 2007, which is now U.S. Pat. No. 7,840,413; and U.S. Provisional Patent Application No. 61/354,604 entitled METHODS AND SYSTEMS FOR DYNAMICALLY SUGGESTING ANSWERS TO QUESTIONS SUBMITTED TO A PORTAL OF AN ONLINE SERVICE, by Patrick McFarlane et al., filed Jun. 14, 2010; and U.S. patent application Ser. No. 13/111,195 entitled METHODS AND SYSTEMS FOR DYNAMICALLY SUGGESTING ANSWERS TO QUESTIONS SUBMITTED TO A PORTAL OF AN ONLINE SERVICE, by Patrick McFarlane et al., filed May 19, 2011; and U.S. Provisional Patent Application No. 61/360,752 entitled METHODS AND SYSTEMS FOR SCORING AND RANKING ARTICLES IN AN ON-DEMAND SERVICES ENVIRONMENT, by Vinodh Rajagopal, filed Jul. 1, 2010; and U.S. patent application Ser. No. 13/082,299 entitled METHOD AND SYSTEM FOR SCORING ARTICLES IN AN ON-DEMAND SERVICES ENVIRONMENT, by Vinodh Rajagopal, filed Apr. 7, 2011; and U.S. Provisional Patent Application No. 61/351,620 entitled METHODS AND SYSTEMS FOR PROVIDING ANSWERS TO USERS OF A MULTI-TENANT DATABASE SYSTEM, by Norimasa Yoshida et al., filed Jun. 4, 2010; and U.S. patent application Ser. No. 13/152,246 entitled METHOD AND SYSTEM FOR PROVIDING ANSWERS TO USERS OF A MULTI-TENANT DATABASE SYSTEM, by Norimasa Yoshida et al., filed Jun. 6, 2011; and U.S. Provisional Patent Application No. 61/350,904 entitled METHOD AND SYSTEM FOR ANSWERS TO CASES ESCALATION, by Norimasa Yoshida et al., filed Jun. 2, 2010; and U.S. patent application Ser. No. 13/151,784 entitled METHOD AND SYSTEM FOR ESCALATING CONTENT OF DISCUSSIONS TO PARTICULAR MEMORY LOCATIONS, by Norimasa Yoshida et al., filed Jun. 6, 2011.

FIELD OF THE INVENTION

The current invention relates generally to scoring and ranking articles.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The easy and efficient retrieval of accurate information and subsequent delivery of this information to the user system has been and continues to be a goal of administrators of database systems.

Unfortunately, conventional database approaches might not process a query as efficiently as the user might want if, for example, the results of the query are not organized correctly. Accordingly, it is desirable to provide techniques enabling better and more relevant organization of the results of a query.

BRIEF SUMMARY

In accordance with embodiments, there are provided mechanisms and methods for scoring and ranking knowledge articles in an on-demand database. These mechanisms and methods for scoring and ranking knowledge articles in an on-demand database can enable embodiments to provide information in response to a user's search query in a manner that allows input from internal and external users. The ability of embodiments to provide user with relevant results as a result of the scoring and ranking of the knowledge articles provides an advantage over other systems.

In an embodiment and by way of example, a method for scoring and ranking knowledge articles in an on-demand database is provided. The method embodiment includes methods for scoring and/or ranking knowledge articles in a multi-tenant database system, by a combination of determining a weight based on voting for each of a plurality of knowledge articles, determining a score based on reference to other knowledge articles for each knowledge article; determining a weight based on visitation by external users for each knowledge article; determining a half-life for each of the knowledge articles; and/or determining a half-life to obtain a final score. In some embodiments, the method also includes receiving a search request from a user of the on-demand services environment; ranking the knowledge articles based on the final score and the relevancy to the search; and providing one or more of the knowledge articles to the user based on the ranking.

Alternative method embodiments include methods for determining, by a host system of a multitenant database having a processor system including one or more processors and a storage system, an increment for a score of an article based on receiving at least one vote for the article; determining, by the processor system, an increment for a score of an article based on a creation of a reference to the article in one or more other articles; determining, by the host system, an increment for a score of an article based on a detection of one or more visitations by one or more users; weighting, by the host system, the increment to the score, so that more recent increments to the score have a higher weight than less recent increments; and storing the score in association with the article in the storage system as an indication of a likelihood that users will be interested in the article.

While the present invention is described with reference to an embodiment in which techniques for scoring and ranking knowledge articles in an on-demand database are implemented in a system having an application server providing a front end for an on-demand database service capable of supporting multiple tenants, the present invention is not limited to multi-tenant databases nor deployment on application servers. In an embodiment the tenants may be organizations with employees and customers, whom may be users of the multitenant database as a result of the organization being a tenant of the multitenant database. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Figure 1:
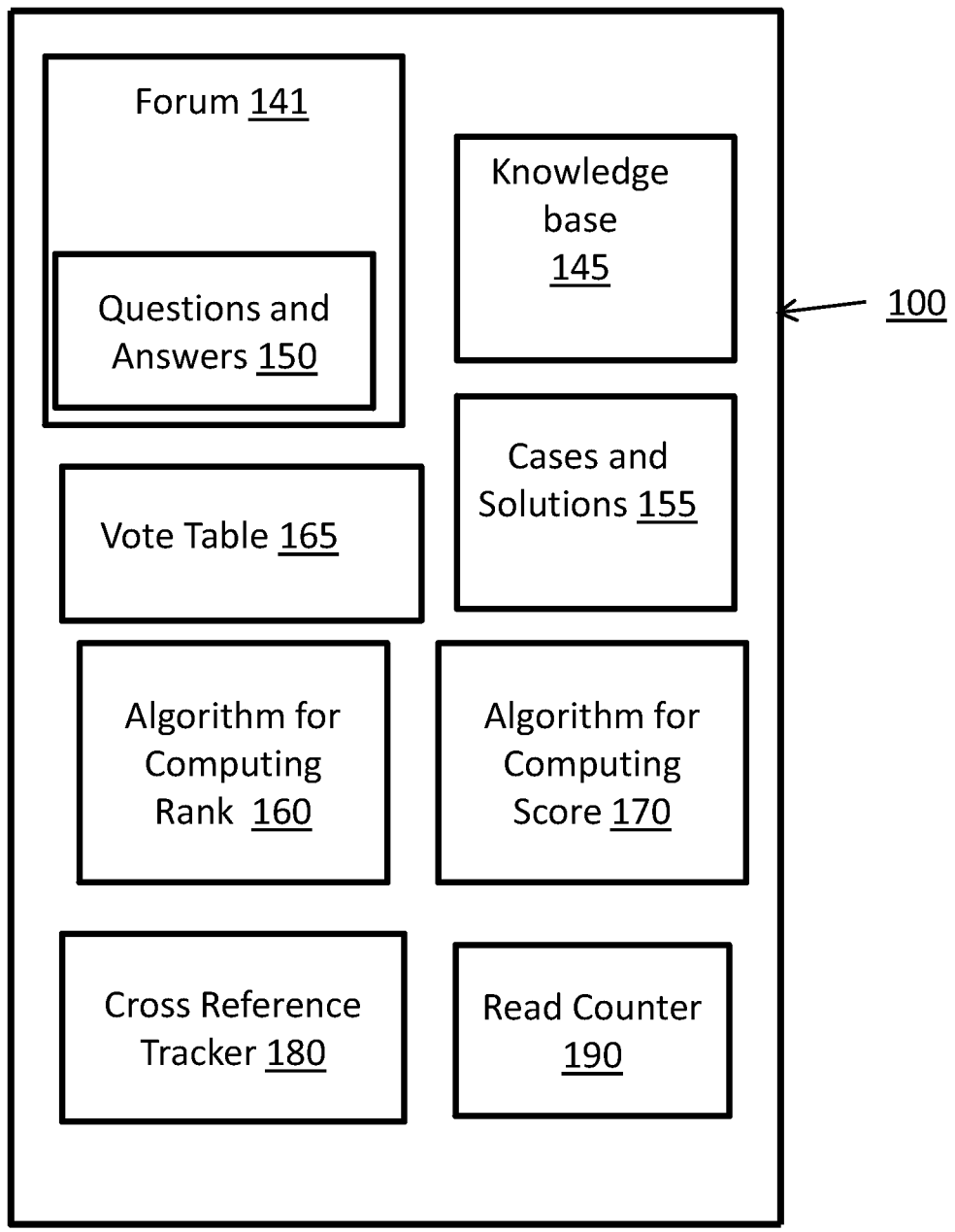
FIG. 1 illustrates a block diagram of example of functional components of the method and system for scoring and ranking articles.

Systems and methods are provided for scoring and ranking in an on-demand service environment. The following detailed description will first describe exemplary functional components for scoring and ranking articles in an on-demand services environment in accordance with aspects and embodiments of the present invention. A block diagram of a document is then detailed.

As used herein, the term multi-tenant database system refers to those systems in which various elements of hardware and software of the database system may be shared by one or more customers. The multitenant database may be a relational database may have multiple tenants. Each of the tenants may be an organization and/or may have their own customers, representatives, and/or employees whom may share and/or benefit from the resources of the multitenant database system, and/or whom may be users of the multitenant database as a result of the organization being a tenant of the multitenant database. For example, a given application server may simultaneously process requests for a great number of customers, and a given database table may store rows for a potentially much greater number of customers. As used herein, the term query plan refers to a set of steps used to access information in a database system. Usage of the tenant's portion of multi-tenant database system may be provided to the tenant on-demand—that is as a service, so that the tenant does not need to be concerned with managing the database system and/or without requiring the tenant to download software related to the multitenant database.

Next, mechanisms and methods for scoring and ranking in an on-demand service environment will be described with reference to example embodiments. The methods involve deriving a score based on a variety of user actions in a forum and/or when processing a search, then ranking the knowledge article. The ranking decides what order a knowledge article appears in a results set returned in response to a user submitting a search.

Next, mechanisms and methods for providing methods and systems for scoring and ranking articles identified using search terms (e.g., keywords) will be described with reference to example embodiments. In this specification a community is a group of users that share a common interest and tend to communicate with one another about that common interest.

A community website is a website in which users share ideas that are related to the community, which may include at least a portion of one or more webpages. An on-demand community is a community website that is created by the tenant using pre-established tools specialized for creating communities. The multitenant database system may provide the pre-established tools specialized for creating the communities. Using the pre-established tools, the community website and the ability to establish a community website may be provided to the tenant of the multitenant database as a service to the tenant that is managed by the multitenant database. The tenant of the multitenant database may not need to download any software to establish and run the community website provided by the multitenant database system. In an embodiment, the focus of the communities may be on-demand enterprise communities, which are communities structured around a business' partners, customers, vendors, representatives, employees, and/or others associated with the business.

A knowledge base is a database for knowledge management. The knowledge bases can be part of a community website. The knowledge base is a collection of articles related to problems and solutions related to the common interest of the community. Knowledge base systems may include tools that help in creating, editing, and managing the database of articles. Knowledge base systems may offer documentation of knowledge and self-learning there by reducing the cost of customer support. The articles in the knowledge base may include some problems and solutions that were initially discussed in the forum, were deemed (e.g., by an administrator) to be of particular importance to users, and were consequently copied from the log of questions and answers of the forum to the knowledge base (and optionally further formatted and/or otherwise enhanced for clarity and/or to provide a more thorough discussion of the topic).

Analytics in this specification refers to the science of analysis concerned with extracting useful properties of data, typically involving extracting properties from large databases. Search analytics in this specification refers to the analysis and aggregation of search engine statistics. Search analytics may help in understanding and/or improving the performance of search engines. Search analytics may include determining search volume trends, analysis of searches, keywords, advertisements, search volume trends, keyword monitoring, search results, advertisement history, advertisement spending statistics, and/or comparisons of websites, for example. The comparison of websites may include a comparison of the number and/or type of users, advertisers, advertisements, keywords, search results, search trends, advertisement trends, and/or advertisement histories, for example.

In this specification a keyword refers to a word or a phrase relevant to a webpage document, via which the document may be found. Keyword can also be a word or a phrase entered in a search engine. In this specification, the term document is generic to a webpage, an article, or other document. A page of results (which may be a webpage) from a keyword search in a search engine may also be referred to as search engine results page. Keywords and search terms are used interchangeably in this specification and may be substituted for one another to obtain different embodiments. In this specification the term keyword search analytics refers to the analysis and aggregation of search engine data. Keyword search analytics can be helpful in understanding the trends and requirements of users which in turn helps in optimizing the database.

The application platform is a platform for hosting a forum about a product or customer related topic. Application platform facilitates the organizing of the questions and answers presented during the forum in a manner so that the information receives appropriate attention. In an embodiment, the forum may be a community website and may have a common goal of discussing a product. Associated with the forum may be several different storage areas (which may each include one or more tables and/or databases). The storage areas may include one storage area for questions and answers, one for customer case management, and one for problems and solutions, for example. The questions and answers storage area may be a log and/or database storing the questions and answers of the forum. The customer case management may store a list of problems that customers are currently having and/or that need to be solved. The customer case management system may store information about specific issues that need to be resolved for specific clients, such as which issues have troubled which clients, how long ago the issue appeared, whether any action has been taken to resolve the problem worked. The problems and solutions may include problems that customers had and how the problems were solved. The knowledge base may be a database of knowledge articles. Generally, knowledge articles may be entered by customer support agents. The terms "knowledge articles" and "articles" are used interchangeably in this specification and may include information that customers, customer care agents, and/or administrators are expected to find useful. The knowledge articles may come from the forum, but optionally knowledge articles may also come from elsewhere. For example, knowledge articles may include articles having information about a new product, tutorials for using a product, and/or other specific topics, may be placed in the knowledge base of the forum by the developer at the time that a produce it released. Once a question is presented to the forum, the question is visible to other users, and the other users can reply to the posted question. If a particular questions is troubling a user, the user has the option of browsing for similar questions to the user's questions or presenting the question to the forum. Apart from answering questions, internal and external users can vote on whether they like the posted question and/or answers (internal users are users that are members of the organization running the multitenant database and external users are users that are not members of the organization running the database, such as members of organizations that are tenants of the multitenant database). If an external user (such as a member of an organization that is a tenant) votes on a posted question or answer, the vote would be referred to as an external vote.

If authorized personnel (that is personnel authorized by the organization running the multitenant database) considers that a particular question has been well addressed, the authorized personnel may vote (and this vote would be an internal votes).

Knowledge Article Scoring

Particular embodiments include an approach that assigns scores to a "knowledge article" in order to support ranking of that article in search results. The score provides an indication of the quality or overall usefulness of an article, but does not measure the relevancy of the article to any particular question or search. In this specification, the quality of the article may refer to the likelihood that others would be interested in the article. When a search query is received one factor in determining the ranking of the article in search results may be the score and another factor determining the ranking may be the relevancy. Thus, for example, the ranking of the article may be determined by adding the score times a first weight to the relevancy times a second weight. Knowledge scoring may include various parameters, such as a rating system, the number of reference to the article being scored in other knowledge articles, the number of references to the article being scored in the cases and solutions storage area, on the number external user visitation to the article being scored, the number of internal user visitations to the article being scored, and/or the age of the article, the votes, the references to the article, and/or the visitations.

Each article may be rated according to a rating system, such as a 5-star rating system. In an embodiment, this 5-star rating may be a primary method of weighting in scoring. If the article is exposed on public sites, and if voting is allowed in the public site, then the votes by public users (external users) may also be assigned a weight (which weights the contribution of the external votes to the score). Rating by internal users may also be assigned an appropriate weight. External votes can reflect the article's score from a public user perspective, which may be considered more important since the external users may be the major consumers of the articles. As such, particular embodiments may assign a higher weight to the votes of external users.

Knowledge articles may also be able to refer to other knowledge articles. Such references aid in keeping the content of a knowledge article focused to a particular topic, and also can avoid repetition of information that is also available in other articles. If a knowledge article "A" is referenced in another article "B," article "A" can thus get additional scores with a predetermined weight. In an embodiment, the referring article's score can also be considered as a parameter in particular embodiments.

Knowledge articles may be referenced in a storage area for cases and solutions (and likely in other entities, such as a storage are for questions and replies that occurred as part of the forum). Whenever an article gets referenced in the cases and solutions storage area, the score of the knowledge article may be incremented by an amount that reflects the expected significance of the reference in indicating the quality of the article (or the degree to which it is expected that others will be interested in the article). In an embodiment, the increment to the score may be the increase in the number of references to the article times a weight.

Also, in particular embodiments, a weight may be assigned based on a number of times an article is visited by external users. Such a weighting may be different than the rating discussed above. For example, a visit to a knowledge article may not be considered as significant as a vote indicating that the voter liked the article. Nevertheless, articles which are read, may receive increments to the scores of those articles based on the number of times the articles are read.

In addition, in an embodiment, a "half-life" may be assigned to votes and/or other increments to the score (similar to the half-life used in computing scores of "ideas") so that newer and active articles may tend to receive higher scores than older, inactive articles (see U.S. patent application Ser. No. 11/716,365, filed Mar. 8, 2007, herein incorporated by reference in its entirety).

A final score of the article can then be computed based on one or more of the above parameters, as well as any suitable additional parameters, and may reflect the likelihood that users will be interested in an article.

In particular embodiments, a score of an article can be maintained as a separate field in the article itself (e.g., in the meta data of the article), and the description of the knowledge article in the universal data description (UDD) may include a field for the score. In other words, there may be a library of templates for different types of documents and/or other objects, which may include the different fields that are to be included in each type of document or object in the library, and the template for the knowledge article may include a field for the score.

Particular embodiments may also be enhanced to automatically detect the references to articles in other articles, in a storage area for cases and solutions, and/or to keep a count of the number of times the article was read and/or visited. Further, different parameters can be configurable by the tenant organization and/or a module deployed (e.g., over the Internet) associated with the web community of the forum.

FIG. 1 illustrates a block diagram of an embodiment of a scoring and ranking system 100. In an embodiment, the functional components 100 may include: forum 141, knowledge base 145, questions and answers 150, cases and solutions 155, algorithm for computing rank 160, vote table 165, algorithm for computing score 170, cross reference tracker 180, and read counter 190. In other embodiments, functional components 100 may not have all of the elements or features listed and/or may have other elements or features instead of or in addition to those listed.

Each block is a functional component of the system for scoring and ranking knowledge articles. Scoring and ranking system 100 may compute the score and/or rank of an article. The forum 141 includes the discussion between users in the forum 141. This can include but is not limited to, online discussions, posting of questions, posting of answers, posting of solutions, posting of opinions, etc. The forum can be about a product or a customer related topic.

The knowledge base 145 is a database for knowledge management. Knowledge base 145 can be part of a community website. Knowledge base 145 is a collection of articles related to problems and solutions related to the common interest of the community knowledge base 145 may include one or more databases (e.g., are relational database) where the articles are stored. Knowledge base 145 may be included in a system that has tools that help in creating, editing, and managing the database of articles stored in knowledge base 145. The system in which knowledge base 145 is stored may offer documentation of knowledge and self-learning thereby reducing the cost of customer support. Optionally, knowledge base 145 may have varying levels of access for different users and/or for different types of users, such that some content is not available if the user does not have authorization, but other content is available to the user.

Questions and answers 150, is a storage area that may store a log of the forum and can be open to the public for searching or may only be partly searchable by the public (there may be different levels of access associated with different content stored in questions and answers 145). In other words, optionally, questions and answers 150 may have varying levels of access for different users and/or for different types of users, such that some content is not available if the user does not have authorization, but other content is available to the user. Questions and answers 150 may be a relations database or other database, which may be a part of, or separate from, knowledge base 145. Optionally, the questions and answers 150 can also include calls or emails. The forum participants may rate how much the participants liked a question or answer. The rating system may be use a "5 star rating system." Someone reviews the questions of the questions and answers.

The questions and answers that are believed to be beneficial for others to read are placed into the knowledge base. In an embodiment, other articles in the knowledge base that relate to the topic of interest of the knowledge article.

Cases and solutions 155 is a storage area that may include a record of customer complaints and the solution arrived at for that customer. Cases and solutions 155 may be a relational database or other database, which may be a part of, or separate from, knowledge base 145. Cases and solutions 155 can be handled by a representative of the company. The representative can create a case when there is a question from a user, which may be updated when there is a solution. Optionally, cases and solutions 155 may have varying levels of access for different users and/or for different types of users, such that some content is not available if the user does not have authorization, but other content is available to the user.

The algorithm for computing rank 160 may include an algorithm for determining the order in which articles are presented to a user in a set of results presented in response to a search. The search engine may rank the knowledge article according to the search term and the relevance. The rank is determined by a combination of the relevance to a particular search (or keyword) and the score.

The vote table 165 may be a table of votes received for a various articles. For example, the table may include one column for document IDs and another column for the number of votes received by the article having that document ID. In an embodiment, voting information is the data related to voting of articles, which might include a normalized score, channel, total sum, total number of votes, and/or the number of 1 star, 2 stars, 3 stars, 4 stars, and/or 5 stars votes. User systems may be capable of accessing the knowledge base in many ways and channel information indicates the access path to the articles in the knowledge base. In some embodiments, voting involves rating an article from 1 to 5 stars, based on the user system sending a vote liking an article and/or the user system sending an indication as to how many stars to award to the idea. An article that has the highest degree of being liked may be awarded a 5 star vote and least liked may receive a 1 star vote. In an embodiment, an article which receives a 5 star vote from the user system is given 10 points, an articles which receives a 4 star vote from the user system is given 5 points, an article which receives a 3 star vote from the user system is given 0 points, an article which receives a 2 star vote from the user system is given −5 points, and an article which receives a 1 star vote from the user system is given −10 points. The normalization of setting what is expected to be an average value (three stars) to the value 0, and assigning negative values to values below the expected average (e.g., −5 for two stars and −10 for one star) and positive values to values that are expected to be above the expected average value (e.g., 5 for four stars and 10 for five stars) results in the total of the scores from several voters being a lower number, and less likely to cause an overflow error. The total votes are the total number of votes an article has received since the initial posting of the article in the forum. The votes may be weighted according to how recently the votes were cast (with more recent votes receiving a higher weight). The vote of external users may be weighted more than internal users. In one embodiment, vote table 165 stores external and internal votes separately (e.g., in different columns), and in another embodiment, only the combination of the external and internal votes are stored. The vote table 165 can include database keys (in addition to or instead of the document ID) to link to other tables. Vote table 165 is optional. The score could be updated with each vote, so that there is no need to store the actual votes.

The algorithm for computing a score 170, can take into account all of the aspects of the score (which will be discussed further below in FIG. 3A) including but not limited to, voting of external and internal users, number of times the knowledge article is visited, reference to other knowledge articles, and age. The score can help to determine the ranking of the knowledge article. The score is not related to a particular search, but a measure of how useful the article is generally expected to be. In an embodiment, the score is updated every time an event occurs that affects the score (e.g., every time someone votes on the article, visits the article, adds a reference to the article in another article). In an alternative embodiment, the score is re-determined at a specific time, e.g., every 30 days, every 7 days, etc. The algorithm for determining the score can be a weighted average. For example the weight for each attribute X the number of such scores is the weighted sum. This can be combined with the decay in time as a way of weighting the votes. The decay in time can be a half-life period, including but not limited to, 10 days if an idea is not being viewed.

In an embodiment, the algorithm computes the score by performing a series of steps that yield a result that is equivalent to or similar to the results of computing the formula, $s = \sum_{i=1}^{N} e^{-\alpha t_i} \sum_{j=1}^{M} w_j F_j(t_i)$, where s is the score, N is the total number of times at which the time score was incremented, i is an index labeling the times at which score was incremented, $t_i$ is the time at the ith time that the score was incremented, M is the total number factors that are used in computing the score, j is an index labeling each factor used to compute the score, $F_j$ is the jth factor used to compute the score, and $w_j$ is the weight assigned to factor $F_j$. The weights $w_j$ are numerical values. The magnitude of any particular weight $w_j$ is not important, but the ration of the each weight with respect to one another determines the relative percentage that factor the weight is associated with is assigned.

One computation that may be performed that is equivalent to the above formula is to compute the score from the following recursive formula, $s(t_i) = K(t_i)\Delta(t_i) + s(t_{i-1})$, where $s(t_{i-1})$ is the prior score computed prior to the most recent increment of the score, which was update at the prior time $t_{i-1}$, $\Delta(t_i)$ is the current increment of the score, which is being incremented at time $t_i$, which may be computed from $\Delta(t_i) = \sum_{j=1}^{M} w_j F_j(t_i)$, $K(t_i)$ is a constant that is incremented essentially every time the score is updated, which is related to the decay constant α, and $s(t_i)$ is the current score being computed at time $t_i$. In an embodiment, $\Delta(t_i)$ may be computed from the formula $\Delta(t_i) = w_{vi} V_{int}(t_i) + w_{vx} V_{ex}(t_i) + w_R R(t_i) + w_c C(t_i)$, where $C(t_i)$ is the number of cross references to the current article received at time $t_i$, $w_c$ is the weight assigned to the number of cross references, $R(t_i)$ is the number of reads or visitations the current article received at time $t_i$, $W_R$ is weight assigned to the number of reads or visitations to the current article, $V_{ex}(t_i)$ is the number of external votes received for the current article received at time $t_i$, $V_{vx}$ is weight assigned to the number external votes for the current article, $V_{int}(t_i)$ is the number of internal votes for the current article received at time $t_i$, and $w_{vi}$ is the weight assigned to the number of internal votes for the current article. To avoid an overflow error, periodically, all of the scores are divided by a large number. In an embodiment, $K(t_i)$ may be computed recursively according to the formula $(t_i) = \beta K(t_{i-1})$, where $K(t_{i-1})$ is the prior constant and is a positive constant greater than 1. The constants β and α are phenomenological constants that are determined experimentally according to the users needs, volume and/or frequency of updates to the score. Consequently, the relationship between β and α is not important—the appropriate value to use for $\beta$ may be determined experimentally without knowledge of $\alpha$ of the specific half life it corresponds.

In an embodiment $w_{vx}$ should be greater than $w_{vi}$ so that external votes are given more weight than internal votes.

Cross reference tracker 180 is an algorithm that tracks cross-references between knowledge articles. The cross-reference tracker can keep track of how many times an article is referenced by other articles. In an embodiment, cross reference tracker 180 detects the creation of a cross reference to an article. In an embodiment, after detecting the creation of a cross reference, cross reference tracker initiates an update of the score for the article and/or updates a counter that tracks the number of cross references to the article.

Read counter 190 measures how many people visit and/or read the article. The read count may be stored in the article itself. The read count may be included in the score. The read count will increase each time an article is opened and/or read.

Figure 2:
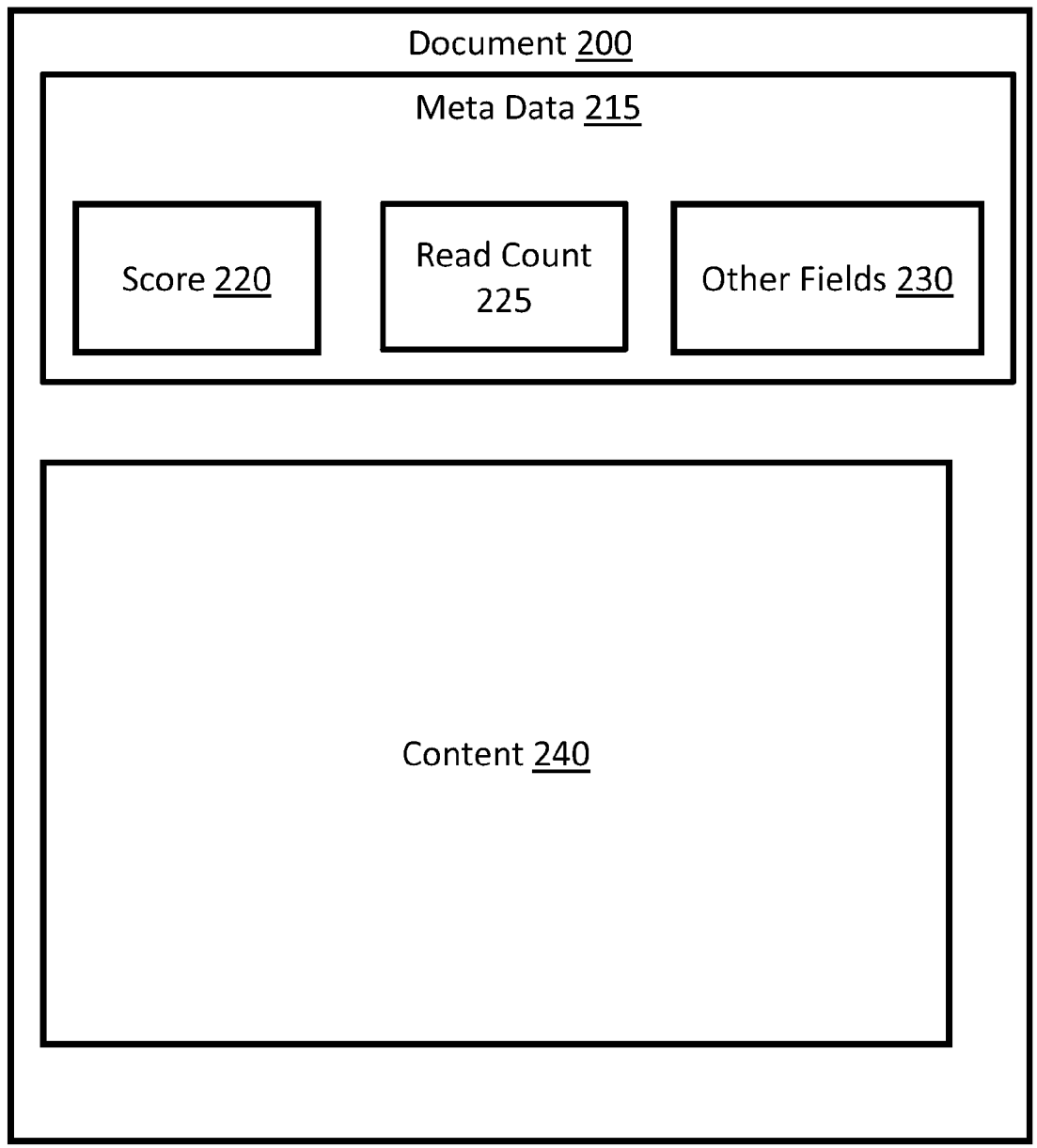
FIG. 2 illustrates a block diagram of an embodiment of a document for use with the method and system for scoring and ranking articles.

FIG. 2 illustrates a block diagram of an embodiment of a document 200 for the method and system for scoring and ranking articles. In an embodiment, the document 200 may include meta data 215, score 220, read count 225, other fields 230, and content 240. In other embodiments, document 200 may not have all of the elements or features listed and/or may have other elements or features instead of or in addition to those listed.

In an embodiment, document 200 is a software version of a document. The document has a text, but also has a something that defines where the page begins and ends and how to open and read.

Meta data 215 includes at least the score 220, the read count 225, and other fields 230. The meta data 215 can include machine instructions (e.g. code) of how to open and read (e.g. render) and a definition for where the page begins and ends. In an embodiment, the meta data is readily visible in a view that intended for developers (as opposed to end users), but is not readily visible in a view that is intended for end users. The meta data may also include the score.

The score 220 of the knowledge article may be stored in the document as part of the meta data 215, which may aid in ranking the knowledge article.

The read count 225 may be stored in meta data 215 and describes the number of times the knowledge article has been read, opened, and/or visited.

Other Fields 230 includes other meta data that is included in the document 200 (in addition to the score 220 and the read count 225). For example, other fields 230 may include a counter that tracks the number of cross references that have been created to the current article.

The content 240 is separate from the meta data 215, and may include the content of the knowledge article, which may include text and/or images, for example. The content 240 can include, but is not limited to, text, discussions, solutions, questions, conversations from the forum, and/or other content. Content 240 may placed in a location of the document that is readily visible to an end user. Content 240 and meta-data 215 may be stored in different locations in a database where document 200 is stored. The system may store machine instructions for placing the content and in the content area of document 200 and the meta data in the meta data area of document 200 based on which are of the database the information is stored. In other words, information in the content area of the database may automatically be placed in the content area of the document upon being rendered, and information in the meta data area of the database may automatically be placed in the meta data area of the document upon being rendered.

Figure 3A:
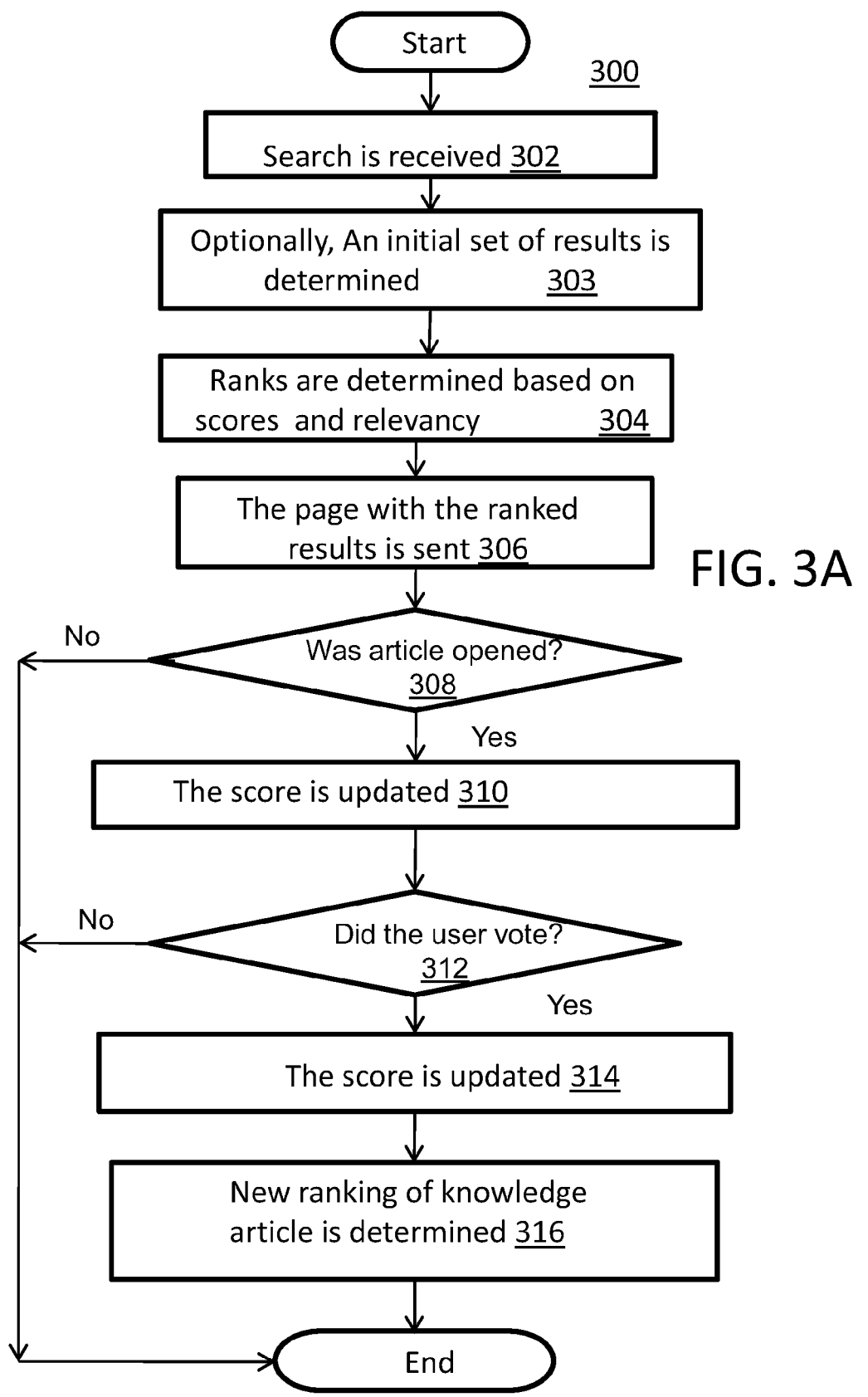
FIGS. 3A-3B are operational flow diagrams illustrating an embodiment of a method of scoring and ranking of articles.
Figure 3B:
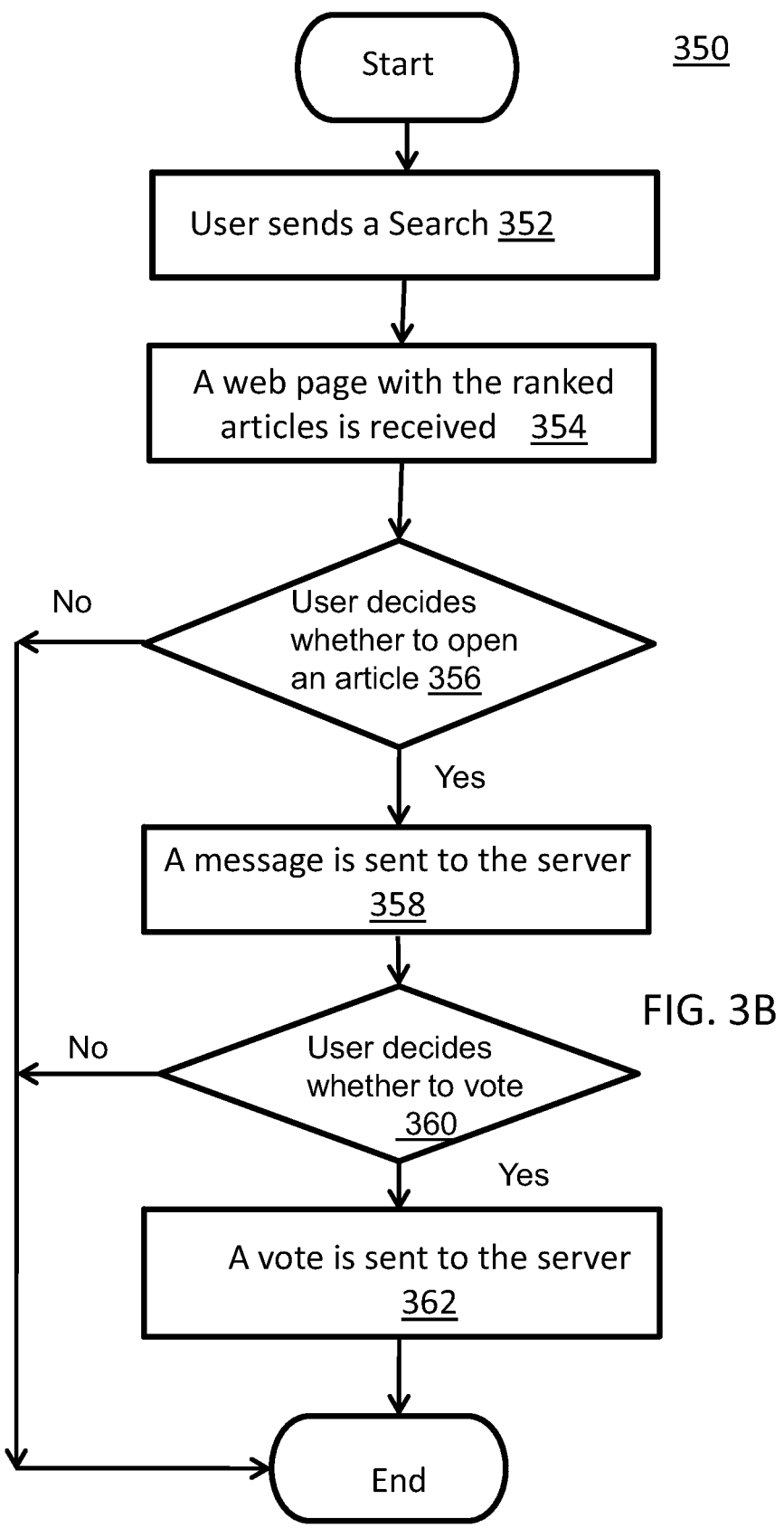
Figure 4:
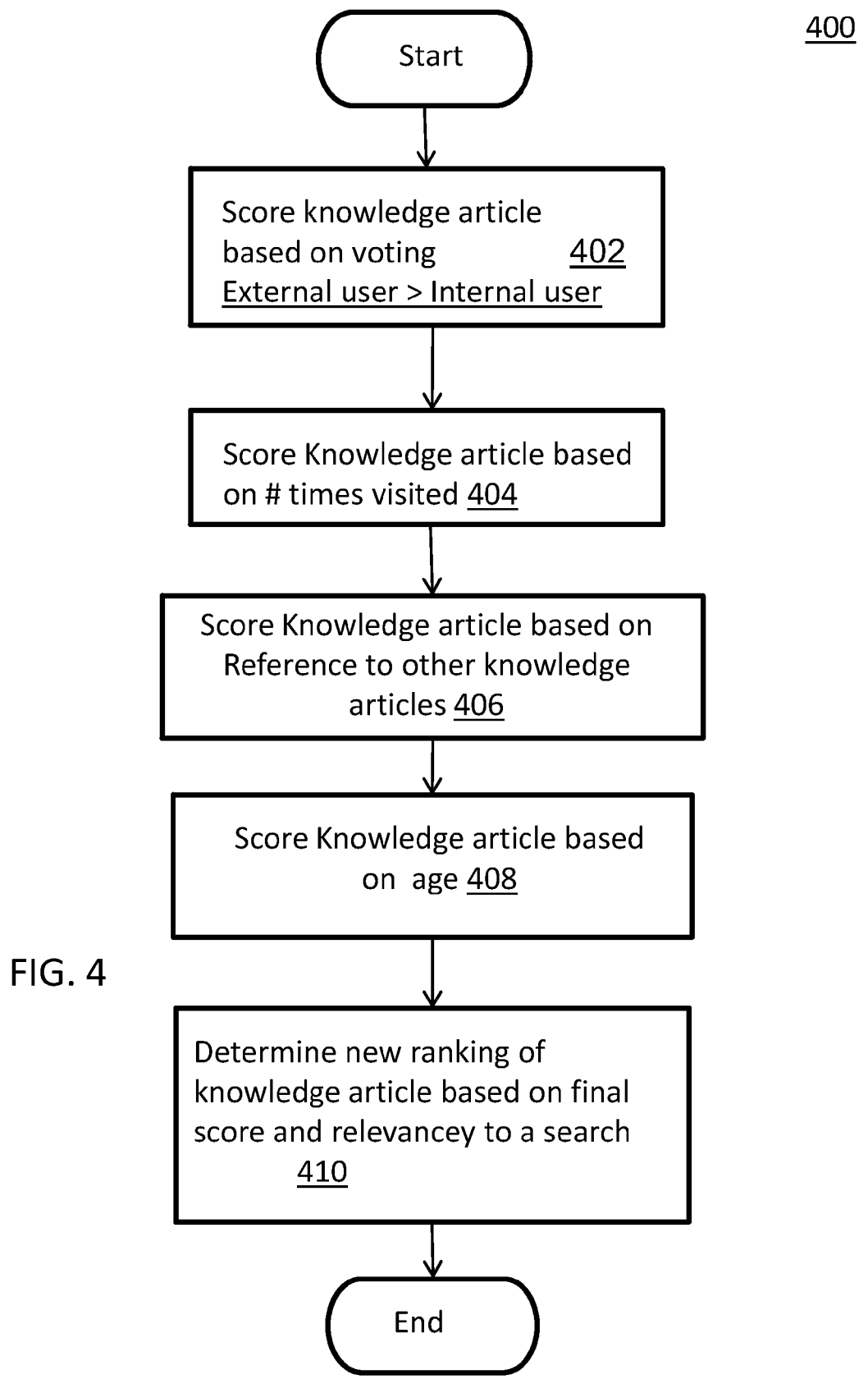
FIG. 4 is a flow diagram illustrating embodiments of scoring and ranking a knowledge article.

Methods of Scoring and Ranking Knowledge Articles (FIGS. 3*a*, 3*b* and 4)

FIGS. 3A-3B show operational flow diagrams illustrating scoring and ranking of articles.

FIG. 3A shows a flowchart of an example of a method of receiving a search 300, carried out by the host system, and shows how the user can influence the score of the knowledge article identified by the search (e.g., the user can vote and/or can influence the score by viewing the article).

In step 302, a search is received from a user. The search can be any type including a keyword search, a question, and/or a complaint.

In step 303, an initial set of articles is determined that match the search to at least some degree (which therefore have a certain degree of relevance). For example, the initial set of articles may be a set of articles that have one or more of the search terms.

In step 304, a ranking is determined for each of the articles found that are in the initial set of articles. The ranking may be a weighted sum of relevancy factors and the score. For example, a certain value may be added to the ranking for each of key word of the search term that is found in the article. The amount that is added to the ranking may depend on the number of times the word is found in the article and/or the ratio of the number of time the terms is found in the article to number of words in the article. An additional amount may be added to the ranking for each of the words of the search term found in the abstract. An additional amount may be added to the ranking for each of the words of the search term found in the title. If article is opened by a user, the read counter is updated, the score recomputed, and the score of the article is updated and stored in the meta data of the score.

In step 306, the results are placed in order of decreasing rank, starting with the article with the highest rank and placed into a page of results that is sent to the user. The user may choose to open one or more of the knowledge articles in the results. By opening the article or articles, the score of the article or articles may be changed (see FIG. 4).

In step 308 a determination is made as to whether a message has been received that the article has been opened and/or read. If the article is opened and/or read, the score is updated. If the article is not opened, the method ends.

In step 310, the score is updated based on the opening and/or reading of an article. The score can be updated as discussed in FIG. 4 (see step 404).

In step 312, a determination is made as to whether a vote has been received from a user. If a vote has been received, the score is updated. If a vote has not been received, the method ends.

In step 314 the score is updated because a vote is received from an external and/or internal user. External votes (from users) may be weighted greater than internal votes. External users are users that are associated with tenants of the multi-tenant database system. Users may also include internal users, public users and/or forum members. Internal users may be users associated with an organization that runs the multi-tenant database system (see also FIG. 4, step 402, which is discussed below).

In step 316 a new score of the knowledge article can be determined based on the new vote (see also FIG. 4).

In another embodiment, although depicted as distinct steps in FIG. 3A, steps 304-310 may not be distinct steps. In other embodiments, method 300 may not have all of the above steps and/or may have other steps in addition to, or instead of, those listed above. The steps of method 300 may be performed in another order. Subsets of the steps listed above as part of method 300 may be used to form their own method.

FIG. 3B shows a flowchart of an example of a user search 350, carried out by the user system, and how the actions of the user can influence the score and/or ranking of a knowledge article. The methods of FIGS. 3A and 3B may be combined to form two parts of the same method, where the method FIG. 3A is the portion of the combined method carried out by the host system and the method of FIG. 3B is the portion of the combined method carried out by the user's system.

In step 352, a user sends a search. The search can be any type including a keyword (or term) search, a question, and/or a complaint. The knowledge articles may be searched by identifying those that are most related to the search term. The search of step 352 of FIG. 3B may be received in step 302 of FIG. 3A.

In step 354, a web page with the ranked articles is received, which may be the result of the ranked articles being sent in step 306 of FIG. 3A. The articles are ranked based on how they fit the search as well as the scores the articles have received. Thus, the method allows for the direct input of one or more users to determine the relevancy and authenticity of an article and to solve particular problems. The user helps to solve answers and scoring is partly or mostly determined by the end-user.

In step 356, a user decides whether to open and/or read and article. If the article is opened and/or read, a message is sent to the server and the score is updated. If the article is not opened, the method ends.

In step 358, if a user opens an article, and the user machine may send a message to the host machine that the article has been opened, which initiates step 308 of FIG. 3A. By opening the article, the user influences the score of the article, by causing step 308 to be performed. The read count of an article increases each time the article is opened and/or read.

In step 360, a user decides whether to vote on an article. If the user votes on the article, a vote is sent to the server. If the user does not vote on the article, the method ends.

In step 362 if the user votes, a vote is sent to the server. The scoring of a particular article can be triggered each time a vote occurs. Each article can include a rating system, such as a 5-star rating system. This 5-star rating may be a primary method of weighting scores. If the article is exposed on public sites, and if voting is allowed in the public site, then the votes by public users may also bear an attached weight thereto. Rating by internal users may also carry an appropriate weight. External votes can reflect the articles score from a public user perspective, which may be considered more important since the external users are the major consumers of the articles. As such, particular embodiments can provide higher weight to the votes of external users.

In another embodiment, although depicted as distinct steps in FIG. 3B, steps 352-358 may not be distinct steps. In other embodiments, method 350 may not have all of the above steps and/or may have other steps in addition to, or instead of, those listed above. The steps of method 350 may be performed in another order. Subsets of the steps listed above as part of method 350 may be used to form their own method.

FIG. 4 shows a flowchart of an example of scoring and ranking a knowledge article 400 by first computing a score and then ranking the knowledge article.

In step 402, the knowledge article is scored based on voting. The scoring of a particular article can be triggered each time a vote occurs. Each article can include a rating system, such as a 5-star rating system. This 5-star rating may be a primary method of weighting in scoring. If the article is exposed on public sites, and if voting is allowed in the public site, then the votes by public users may also bear an attached weight thereto. Rating by internal users may also carry an appropriate weight. External votes can reflect the articles score from a public user perspective, which may be considered more important since the external users are the major consumers of the articles. As such, particular embodiments can provide higher weight to the votes of external users.

In step 404, the knowledge article is scored based on the number of times the article is visited, which may be recorded in the rate counter value. Also, in particular embodiments, a weight may be assigned based on the number of times an article is visited. For example, a visit to a knowledge article may not be considered as significant as a voting. Nevertheless, articles which are read, can receive scores based on the number of times the articles are read. The number of times the article is read or visited is taken into account and used to update the score each time the score is updated and/or each time the article is visited and/or read.

In step 406, a knowledge article is scored based on reference to other knowledge articles. Knowledge articles may also be able to refer to other knowledge articles. Cross references from one article to another aid in keeping the content of a knowledge article focused to a particular topic, and also can avoid repetition of information that is also available in other articles. If a knowledge article "A" is referenced in another article "B", article "A" can thus get additional scores with predetermined weight. In an embodiment, the referring article's score can also be considered as a parameter in particular embodiments. The cases and solutions and other questions and answers can trigger a new score Links can be put in knowledge articles to refer to other knowledge articles. The links can be a label of the knowledge article that can be used by outside users to uniquely identify knowledge articles so that when an article references another, the knowledge article can easily be found. Cross referencing can be tracked as the cross references are added to the article so that the cross reference will be added to the score of the article. Thus, each time the article is referenced, a new score can be determined. The links may also be a way for managers to see and follow activities related to the usage of a customer support system. The links can be used for the manager to see the evolution of activities over time.

In step 408, a knowledge article is scored based on age. In addition, each increment to the score may be associated with a "half-life," so that newer activities that cause the score to be incremented may receive a higher score than older activities of the same type. For example, more recent votes may have a higher weight than older votes, more recent visits may have a higher weight than visits votes, and/or more recent cross references may have a higher weight than older cross references. The order of steps 402-406 is not important, but they must be finished before the knowledge article can be scored based on age. The score based on age can be computed as a weighted sum. The weighted sum can be based on the weight given to each vote as well as the time.

In step 410, a new score of the knowledge article is determined. A final score of the article can then be computed based on one or more of the above parameters, as well as any suitable additional parameters, and may reflect the ranking of the article in the search results. Each time a search is performed, the relevancy of the article to the search terms is determined and is combined with the score to form a ranking of the article.

In another embodiment, although depicted as distinct steps in FIG. 4, steps 402-410 may not be distinct steps. In other embodiments, method 400 may not have all of the above steps and/or may have other steps in addition to, or instead of, those listed above. The steps of method 400 may be performed in another order. Subsets of the steps listed above as part of method 400 may be used to form their own method.

System Overview

Figure 5:
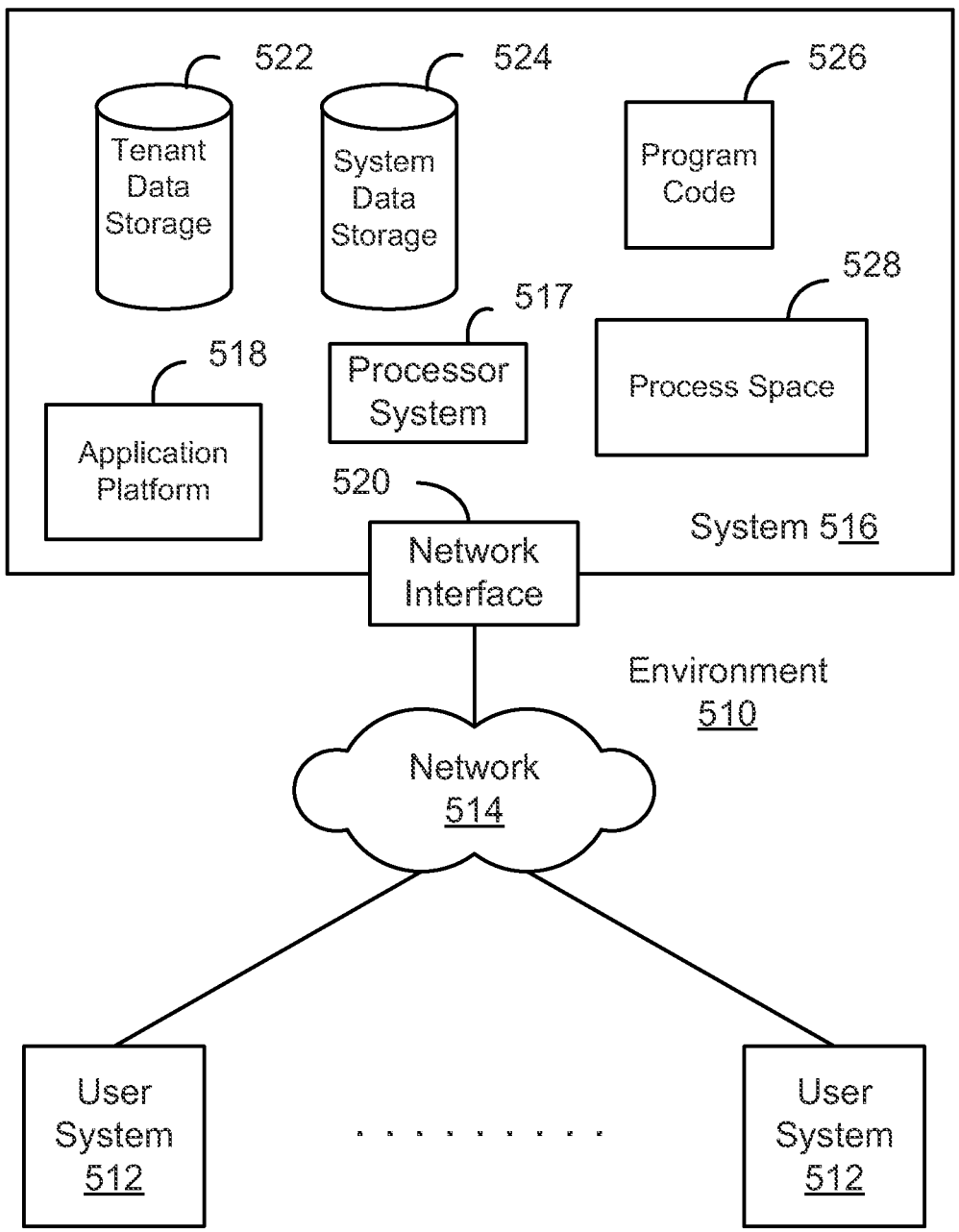
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 625 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
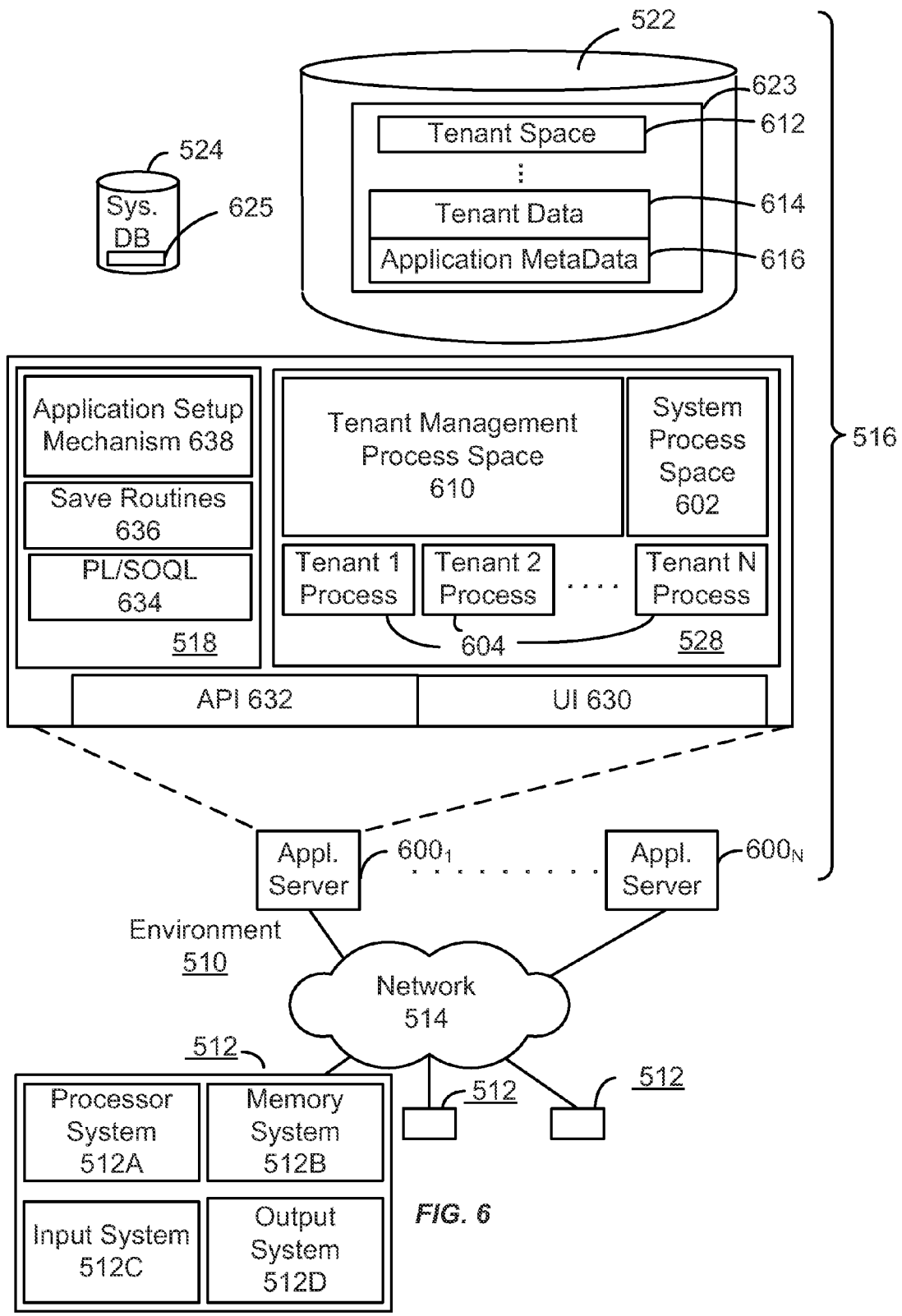
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 625, User Interface (UI) 630, Application Program Interface (API) 632, PL/SOQL 634, save routines 636, application setup mechanism 638, applications servers 1000$_1$-1000$_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 625 therein to serve requests of user systems 512. The tenant data 523 might be divided into individual tenant storage areas 612, which can be either a physical arrangement and/or a logical arrangement of data. Within each tenant storage area 612, tenant data 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 625 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 16 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 5 and 6)

Figure 7:
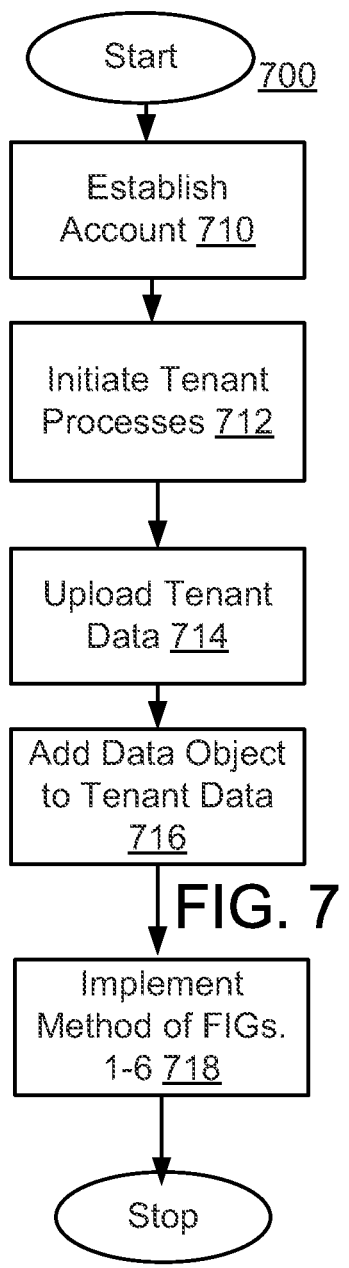
FIG. 7 is a flowchart of an example of a method of using the environment in FIGS. 5 and 6.

FIG. 7 shows a flowchart of an example of a method 700 of using environment 510. In step 710, user system 512 (FIGS. 5 and 6) establishes an account. In step 712, one more tenant process space 604 (FIG. 6) are initiated on behalf of user system 512, which may also involve setting aside space in tenant space 612 (FIG. 6) and tenant data 614 (FIG. 6) for user system 512. Step 712 may also involve modifying application metadata to accommodate user system 512. In step 714, user system 512 uploads data. In step 716, one or more data objects are added to tenant data 114 where the data uploaded is stored. In step 718, method 700 may be implemented. In another embodiment, although depicted as distinct steps in FIG. 4, steps 702-718 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

Figure 8:
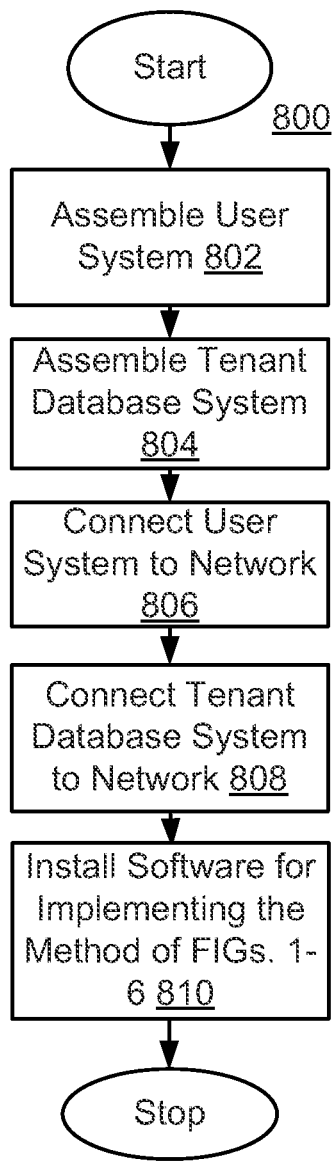
FIG. 8 is an embodiment of method of making the environment in FIGS. 5 and 6.

Method for Creating the Environment (FIGS. 8)

FIG. 8 is a method of making environment 510, in step 802, user system 512 (FIGS. 5 and 6) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 804, system 516 (FIGS. 5 and 6) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 516 may include installing application platform 518, network interface 520, tenant data storage 522, system data storage 524, system data 625, program code 526, process space 528, UI 630, API 632, PL/SOQL 634, save routine 636, application setup mechanism 638, applications servers $600_1$-$600_N$, system process space 602, tenant process spaces 604, tenant management process space 610, tenant space 612, tenant data 614, and application metadata 616 (FIG. 6).

In step 806, user system 512 is communicatively coupled to network 514. In step 808, system 516 is communicatively coupled to network 514 allowing user system 512 and system 516 to communicate with one another (FIG. 6). In step 810, one or more instructions may be installed in system 516 (e.g., the instructions may be installed on one or more machine readable media, such as computer readable media, therein) and/or system 516 is otherwise configured for performing the steps of methods 3A, 3B and 4. For example, as part of step 810, one or more instructions may be entered into the memory of system 16 for scoring and ranking knowledge articles.

In another embodiment, although depicted as distinct steps in FIG. 8, steps 802-810 may not be distinct steps. In other embodiments, method 800 may not have all of the above steps and/or may have other steps in addition to, or instead of, those listed above. The steps of method 800 may be performed in another order. Subsets of the steps listed above as part of method 800 may be used to form their own method.

Extensions and Alternatives

In another embodiment, a different normalization may be used, such as assigning −3 to one star, −2 to two stars, 2 to four stars, and 3 to five stars. In another embodiment, the user may have fewer or more stars to choose from (zero stars or one star to three stars or ten stars). In another embodiment rather than stars another symbol may be used, such as how many thumbs up and/or down. In an embodiment, there is no normalization. In another embodiment, the user directly chooses the points on scale that starts from a negative number and ends with a positive number. In an embodiment, the user may have multiple systems of rating an article, and the user may choose to make an entry in each. For example, there may be an option to indicate that an article is the "best" article and/or the user may be able to choose to indicate the user "liked" or "disliked" the article in addition to or instead of assigning a number of points or stars to the article. An entry in each system of rating the article may affect the score of the article, by a different amount.

In an embodiment, prior search results from prior searches may be saved along with the prior rankings, and when a new search is received with the same search term, the prior results may be retrieved, and the rankings may be updated based on the updates to the score since the last search, and then the search results may be returned to the user with articles placed in the order of the new ranking. In an embodiment, the amount of time that the user keeps the article open may affect the score.

In an alternative embodiment, the score may be computed from the formula, $s(t_i)=\Delta t_i + s(t_{i-1})/\kappa$, where $\kappa$ is a positive constant greater than 1, or using the formula $s(t_i)=\Delta(t_i)+s(t_{i-1})e^{-\alpha(t_i-t_{i-1})}$. Using the formula, $s(t_i)=\Delta(t_i)+s(t_{i-1})/\kappa$ or $s(t_i)=\Delta(t_i)+s(t_{i-1})e^{-\alpha(t_i-t_{i-1})}$ may reduce the number of times that all the scores need to be divided by a constant to prevent overflow errors or essentially eliminate the need for dividing all of the scores by a constant.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
    determining, by a host system of a database system, the host system having a processor system including one or more processors and a storage system, an increment to a score of an article based on:
        at least one vote for the article, the at least one vote being weighted higher for votes from external users than votes from internal users, the internal users being internal with respect to an organization controlling the article, the external users being external with respect to the organization, a reference to the article in at least one other article, the reference including a link in the at least one other article, the link providing access to the article, a score of the at least one other article, at least one visitation to the article by at least one user, and a ratio of a number of occurrences of a phrase in the article to a number of words in the article;

weighting, by the host system, the increment to the score, so that more recent increments to the score have a higher weight than less recent increments; and storing the score in association with the article in the storage system as an indication of a likelihood that users will be interested in the article.

2. The method of claim 1, wherein the article is a knowledge article and the knowledge article is an article that is on a topic that is expected to be of interest to a user.

3. The method of claim 1, further comprising:
receiving a search request from a user of the database;
ranking articles based on the score and a relevancy to the search; and
providing one or more of the articles to the user based on the ranking.

4. The method of claim 1, wherein the determining the increment for the score of the article further comprises:
determining a score based on an increment in how many references to the article are in Cases and Solutions, wherein Cases and Solutions is a record of customer complaints and solutions arrived at for customers.

5. The method of claim 1, wherein the determining the reference further comprises:
determining a score based on an increment to how many references to the article are in Questions and Answers, wherein Questions and Answers is a record of customer questions and the answers arrived at for customers.

6. The method of claim 1, wherein the votes include votes from external users, external users being users that are not internal users, internal users being users associated with an organization that runs the database system; and votes from internal users.

7. The method of claim 6, further comprising:
weighting the votes of external users greater than the votes of internal users.

8. The method of claim 1, the score being an overall score, the method further comprising:
receiving a user-assigned score from a user; and
normalizing the user assigned score by at least changing the scale of the user assigned score from an initial scale by at least setting an average value of all possible scores of the initial scale to 0, assigning negative values to values of the initial scale that are less than the average of all scores, and assigning positive values to values of the initial scale that are greater than the average of all scores.

9. The method of claim 1, wherein the determining of the increment for the score of an article based on the detecting of the one or more visitations increases a read count of the article, and the read count of the article is stored in meta data of the article.

10. The method of claim 1, wherein the vote is stored in the article in meta data of the article.

11. The method of claim 1, wherein the score is stored in meta data of the article.

12. The method of claim 1, further comprising:
receiving at a host system, an article to store; and
storing a copy of the article in a storage accessible to the host system.

13. The method of claim 1, wherein the visitations are made by multiple users.

14. The method of claim 8, wherein user-assigned scores are received from multiple users.

15. The method of claim 1, wherein the ratio is the number of occurrences of the phrase in the article to the number of words in an abstract of the article.

16. A non-transitory machine-readable medium carrying one or more sequences of instructions, which when executed by one or more processors, cause:
determining, by a host system of a database system, the host system having a processor system including one or more processors and a storage system, an increment to a score of an article based on:
at least one vote for the article, the at least one vote being weighted higher for votes from external users than votes from internal users, the internal users being internal with respect to an organization controlling the article, the external users being external with respect to the organization,
a reference to the article in at least one other article, the reference including a link in the at least one other article, the link providing access to the article,
a score of the at least one other article,
at least one visitation to the article by at least one user, and
a ratio of a number of occurrences of a phrase in the article to a number of words in the article;
weighting, by the host system, the increment to the score, so that more recent increments to the score have a higher weight than less recent increments; and
storing the score in association with the article in the storage system as an indication of a likelihood that users will be interested in the article.

17. The non-transitory machine readable medium of claim 16, wherein the article is a knowledge article and the knowledge article is an article that is on a topic that is expected to be of interest to a user.

18. The non-transitory machine readable medium of claim 16, further comprising:
receiving a search request from a user of the database;
ranking the articles based on the final score and the relevancy to the search; and
providing one or more of the articles to the user based on the ranking.

19. A system comprising:
one or more machines having a processor system including one or more processors;
a storage system having one or more machine readable-media storing at least articles on topics that are expected to be of interest to a forum;
a relational database;
one or more machine instructions, which when invoked, cause the system to implement a method including at least:
receiving, at the system, a vote from an external user for an article;
receiving, at the processor system, a vote from an internal user;
determining an increment to a score of an article based on:
at least one vote for the article, the at least one vote being weighted higher for votes from external users than votes from internal users, the internal users being internal with respect to an organization controlling the article, the external users being external with respect to the organization, a reference to the article in at least one other article, the reference including a link in the at least one other article, the link providing access to the article,
a score of the at least one other article,
at least one visitation to the article by at least one user, and
a ratio of a number of occurrences of a phrase in the article to a number of words in the article;
weighting, by the processor system, the increment to the score, so that more recent increments to the score have a higher weight than less recent increments; and
storing the score in association with the article in the storage system as an indication of a likelihood that users will be interested in the article.

* * * * *